(12) United States Patent
Vicknair

(10) Patent No.: US 6,761,130 B1
(45) Date of Patent: Jul. 13, 2004

(54) PET LITTER DEVICE

(76) Inventor: Dean A. Vicknair, 248 Maximillian St., Baton Rouge, LA (US) 70802

( * ) Notice: Subject to any disclaimer, the term of this patent is extended or adjusted under 35 U.S.C. 154(b) by 0 days.

(21) Appl. No.: 10/654,694

(22) Filed: Sep. 4, 2003

(51) Int. Cl.$^7$ ................................................. A01K 1/035
(52) U.S. Cl. ....................................... 119/165; D30/161
(58) Field of Search ................................. 119/165, 169, 119/170; D23/348; D30/161, 162

(56) References Cited

U.S. PATENT DOCUMENTS

| | | | |
|---|---|---|---|
| 3,822,671 A | | 7/1974 | Rosenberg |
| 4,299,190 A | | 11/1981 | Rhodes |
| D298,371 S | * | 11/1988 | Reynolds .................... D30/161 |
| D308,589 S | * | 6/1990 | Shay ......................... D30/161 |
| 5,058,528 A | * | 10/1991 | Counseller et al. ......... 119/165 |
| 5,184,568 A | | 2/1993 | Healey |
| 5,184,575 A | | 2/1993 | Reinartz |
| 5,394,835 A | | 3/1995 | Gatta |
| 5,662,066 A | | 9/1997 | Reitz |
| 5,713,302 A | | 2/1998 | Walter |
| 5,749,317 A | | 5/1998 | Richey et al. |
| 5,970,914 A | | 10/1999 | Steil et al. |
| 5,975,017 A | * | 11/1999 | Cameron ..................... 119/165 |
| 6,286,458 B1 | | 9/2001 | Rawson |
| 6,463,881 B1 | | 10/2002 | Reitz |
| D470,582 S | * | 2/2003 | Jeng .......................... D23/348 |
| 2002/0139312 A1 | | 10/2002 | Reitz |

* cited by examiner

Primary Examiner—Robert P. Swiatek
(74) Attorney, Agent, or Firm—David L. Ray

(57) ABSTRACT

A pet litter device having the outward shape of a chiminea, the pet litter device including a hollow bulbous enlarged diameter portion having an upper end and a lower end, the lower end having a circular floor therein for receipt of pet litter, the hollow bulbous enlarged diameter portion having an opening therein for providing access to the interior of the hollow bulbous enlarged diameter portion, the hollow bulbous enlarged diameter portion having a hollow reduced diameter portion connected to the upper end thereof for receipt and storage of pet litter, and the hollow reduced diameter portion therein for supporting pet litter stored therein, the circular cone-shaped floor having a valve in the center thereof for selectively dispensing pet litter into the interior of the bulbous enlarged diameter portion.

13 Claims, 3 Drawing Sheets

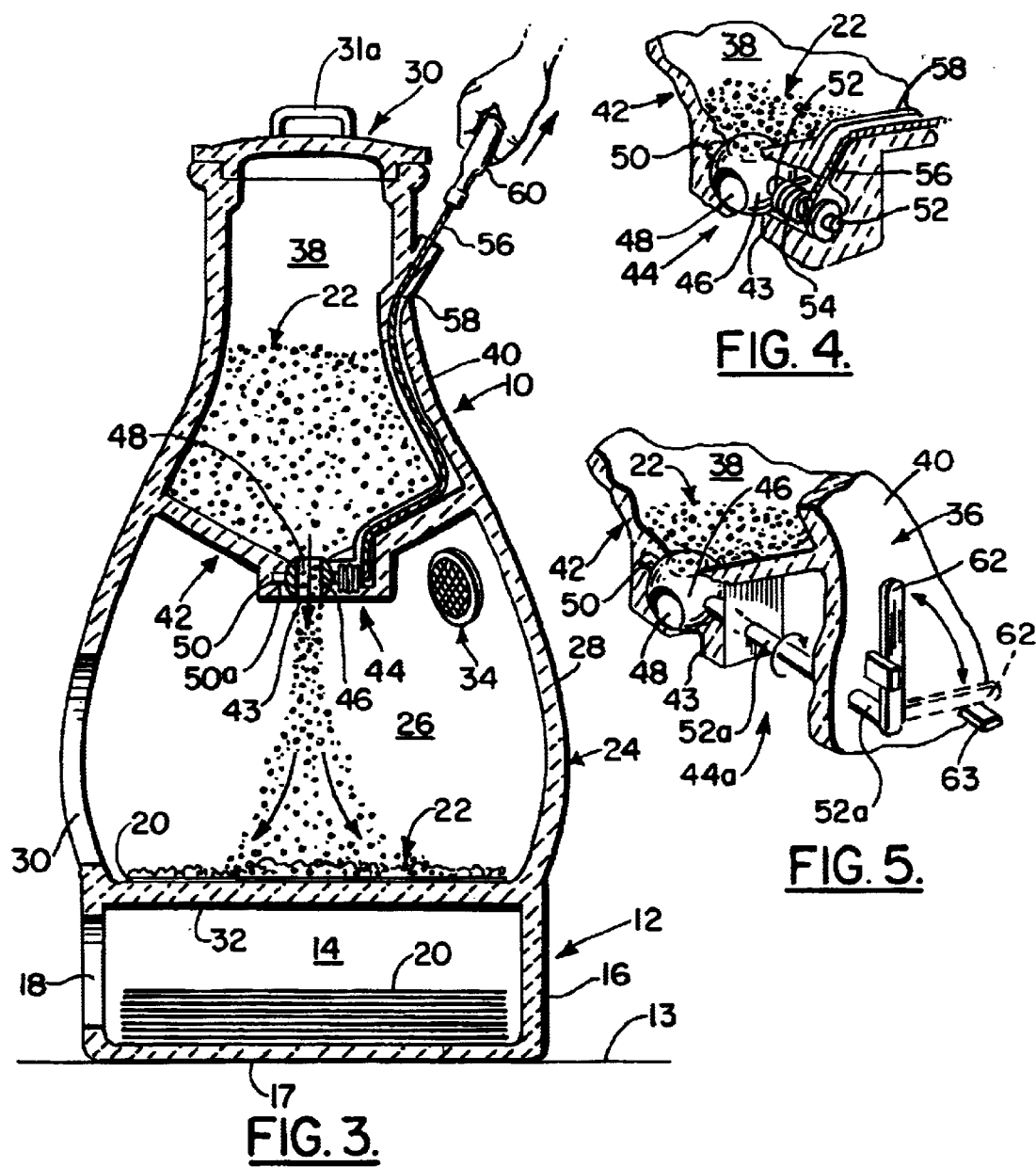

PET LITTER DEVICE

BACKGROUND OF THE INVENTION

1. Field of the Invention

The present invention relates to devices for containing and dispensing pet litter. In particular, the present invention relates to devices for containing and dispensing cat litter.

2. Description of the Related Art

Pets such as domestic cats and kittens are commonly housed in the homes of their owners. Pet litter well known in the art is commonly placed in containers for absorbing and covering urine and fecal matter eliminated by such pets.

However, devices for containing pet litter commonly have no means for storing and dispensing litter therein. Furthermore, such devices are often bulky and unsightly.

Devices for storing and/or dispensing pet litter are known in the art. Exemplary of the related art are the following U.S. Pat. Nos.: 3,822,671; 4,299,190; 5,184,568; 5,184,575; 5,286,458 B1; 5,394,835; 5,662,066; 5,713,302; 5,749,317; 5,970,914; 6,463,881 B2; and U.S. Patent Application Publication 2002/0139312 A1.

BRIEF SUMMARY OF THE INVENTION

In accordance with the present invention there is provided a pet litter device having the outward shape of a chiminea, the pet litter device including a hollow bulbous enlarged diameter portion having an upper end and a lower end, the lower end having a circular floor therein for receipt of pet litter, the hollow bulbous enlarged diameter portion having an opening therein for providing access to the interior of the hollow bulbous enlarged diameter portion, the hollow bulbous enlarged diameter portion having a hollow reduced diameter portion connected to the upper end thereof for receipt and storage of pet litter, and the hollow reduced diameter portion having a circular cone-shaped floor therein for supporting pet litter stored therein, the circular cone-shaped floor having a valve in the center thereof for selectively dispensing pet litter into the interior of the bulbous enlarged diameter portion.

BRIEF DESCRIPTION OF THE SEVERAL VIEWS OF THE DRAWINGS

FIG. 3 is a cross-sectional view of the pet litter device of the invention taken along lines 2—2 of FIG. 1 showing a valve in the invention opened to dispense pet litter into the bottom of the pet litter device of the invention;

FIG. 4 is an enlarged, partly cut-away, partly cross-sectional view of the valve shown in FIGS. 2 and 3; and FIG. 5 is an enlarged partly cut-away, partly cross-sectional view of an alternate embodiment of a valve for the pet litter device of the invention.

DETAILED DESCRIPTION OF THE INVENTION

Figure 1:
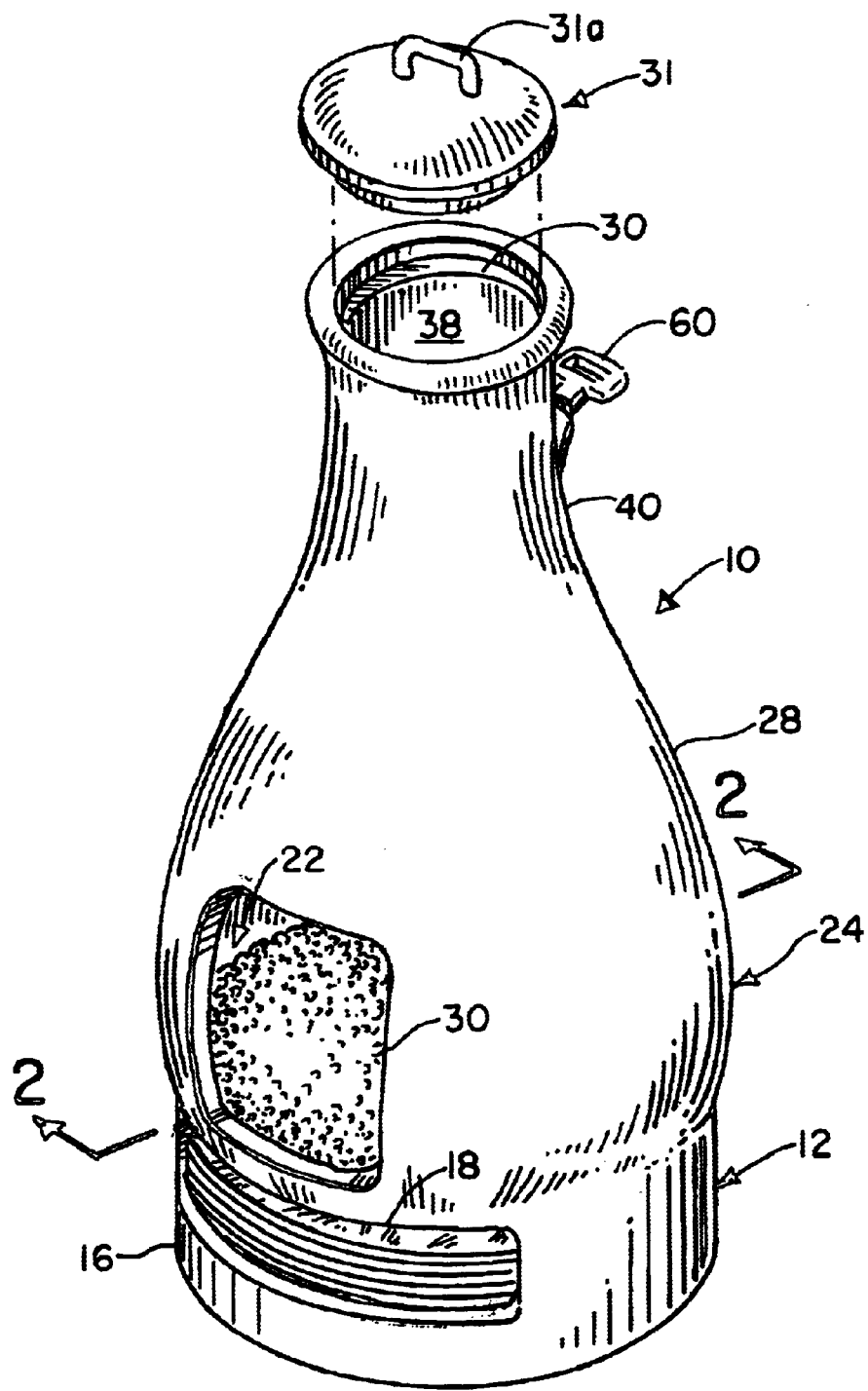
FIG. 1 is a perspective elevational view of the pet litter device of the invention.

Referring now to the drawings, and in particular to FIG. 1, the pet litter device of the invention is generally indicated by the numeral 10. Pet litter device 10 has the general shape of a chiminea. As is known to those skilled in the art, a chiminea is an outdoor wood burning device commonly produced from clay which is used as an outdoor fireplace. Originally, as known to those skilled in the art, chimineas were used as bread ovens in Mexico.

Pet litter device 10 is generally circular in horizontal cross-section. Pet litter device 10 preferably has a base portion generally indicated by the numeral 12 which rests upon the ground or floor 13. Base portion 12 has a hollow interior chamber 14 surrounded by exterior wall 16 which extends upward from circular base 17. Base portion 12 is preferably generally cylindrical in shape. Opening 18 is provided in exterior wall 16 to provide access to interior chamber 14. Preferably opening 18 is generally rectangular in shape.

Various materials may be stored inside interior chamber 14 such as multiple flexible cover sheets 20 for receiving the pet litter generally indicated by the numeral 22. Pet litter 22 may be particulate domestic cat litter well known in the art and sometimes referred to as "kitty litter". Pet litter 22 is used to absorb feces and urine from pets such as domestic cats and kittens, and the like. Cover sheet 20 upon which pet litter 22 is received and rests upon can be used to remove used pet litter 22 from the pet litter device 10 of the invention.

Located directly above base portion 12 is a hollow bulbous enlarged diameter portion generally indicated by the numeral 24. Enlarged diameter portion 24 has a hollow interior chamber 26 surrounded by exterior wall 28. Opening 30 is provided in exterior wall 28 to provide access to interior chamber 26 by pets and persons removing the pet litter 22 and sheet 20 therefrom. Opening 30 enables a pet such as a domestic cat or kitten to enter into hollow interior chamber 26 to defecate or urinate on pet litter 22 contained therein. Preferably opening 30 is generally rectangular in shape.

Interior chamber 26 has a circular floor 32 which separates interior chamber 26 and interior chamber 14. Circular floor 32 is connected to exterior wall 28 of enlarged portion 24 and exterior wall 16 of base portion 12. Circular floor 32 supports cover sheet 20 and pet litter 22. Cover sheets 20 are preferably constructed from water impermeable material to prevent the surface of floor 32 from being stained by pet feces and urine.

An air filter generally indicated by the numeral 34 may be located in the exterior wall 28 of enlarged diameter portion 24. Air filter 34 filters fecal odors from the air inside interior chamber 26 flowing therethrough. Air filter 34 is preferably a charcoal containing filter well known in the art.

Located directly above interior chamber 26 and enlarged diameter portion 24 is the upper reduced diameter portion generally indicated by the numeral 36. Reduced diameter portion 36 is substantially smaller in diameter than the diameter of hollow bulbous enlarged diameter portion 24. Preferably, reduced diameter portion 36 has a maximum diameter of less than one-half of the maximum diameter of hollow bulbous enlarged diameter portion 24. Reduced diameter portion 36 has a hollow interior chamber 38 surrounded by exterior wall 40. Circular opening 30 is provided in the upper end of reduced diameter portion 36 to provide access to interior chamber 38.

Hollow interior chamber 38 is used as a reservoir for pet litter 22. Pet litter 22 may be poured into hollow interior chamber 38 through opening 30. A cylindrical lid generally indicated by the numeral 31 having handle 31a is provided to cover opening 30.

Hollow interior chamber 38 of reduced diameter portion 36 has a downwardly sloping circular cone-shaped floor generally indicated by the numeral 42. Circular cone-shaped floor 42 is connected at its outer edges to exterior wall 40 of reduced diameter portion 36 and to exterior wall 28 of hollow bulbous enlarged diameter portion 28. Circular cone-shaped floor 42 separates interior chamber 26 of hollow bulbous enlarged diameter portion 24 and interior chamber 38 of reduced diameter portion 36. Circular cone-shaped floor 42 supports pet litter 22 stored in interior chamber 38 of reduced diameter portion 36.

Figure 2:
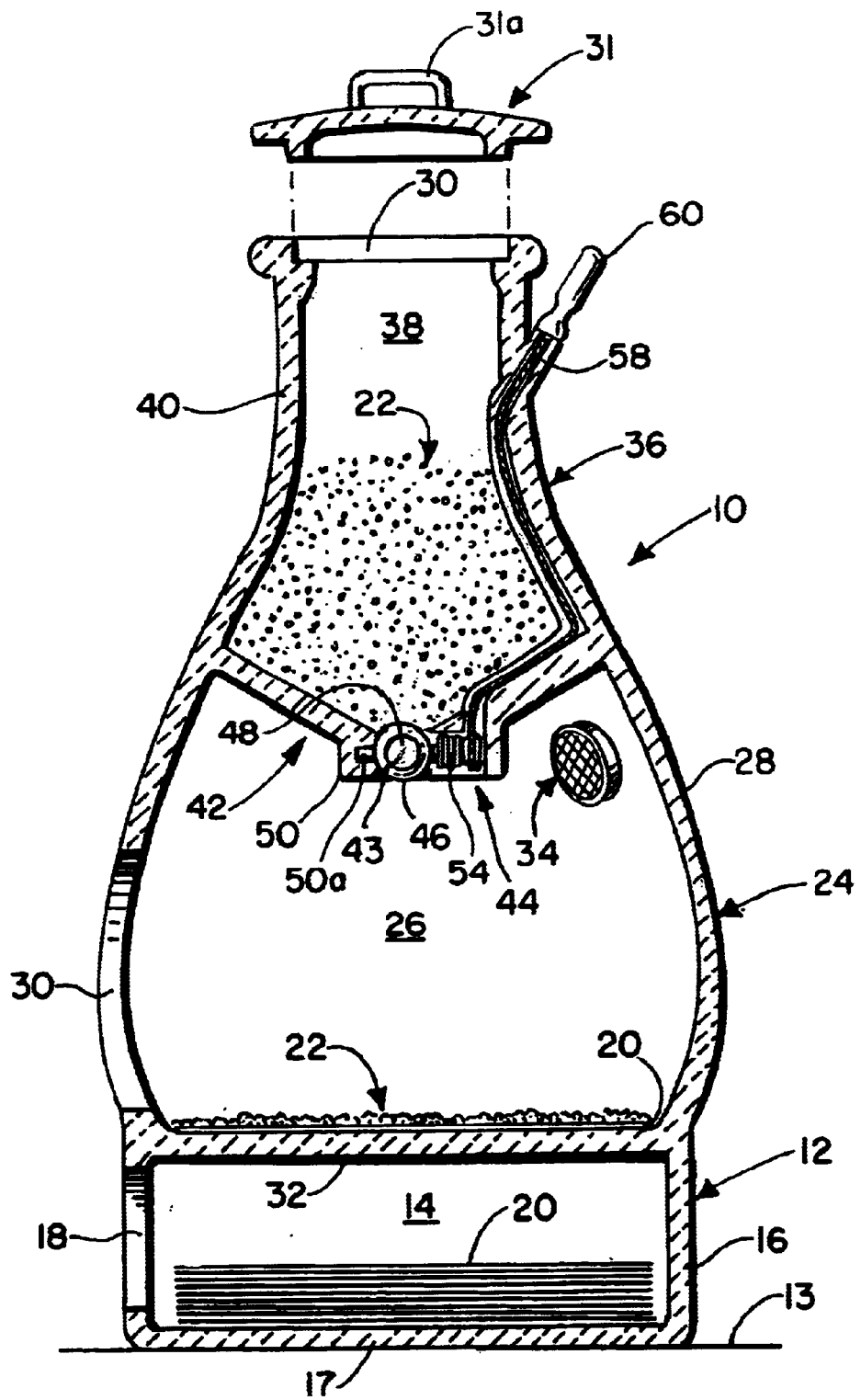
FIG. 2 is a cross-sectional view of the pet litter device of the invention taken along lines 2—2 of FIG. 1.

Sloping floor 42 has the general shape of a downwardly tapered cone having an opening 43 through which particulate pet litter 22 flows as shown in FIG. 3. Opening 43 has a valve generally indicated by the numeral 44 in the center thereof to control flow of particulate pet letter 22 therethrough. Valve 44 is utilized to selectively dispense pet litter 22 from hollow interior chamber 38 of reduced diameter portion 36 through opening 43 to interior chamber 26 of hollow bulbous enlarged diameter portion 24. Pet litter 22 is preferably received on sheet 20 supported by floor 32 as shown in FIGS. 2 and 3.

Valve 44 includes a sphere 46 having a cylindrical passage 48 extending through the center thereof to the outer surfaces thereof. A first cylindrical shaft 50 is rigidly connected perpendicularly to the surface of sphere 46 and aligned perpendicularly to the central axis of cylindrical passage 48. First cylindrical shaft 50 is rotatably received in cylindrical recess 50a in circular cone-shaped floor 42.

A second cylindrical shaft 52 shown in detail in FIG. 4 is rigidly connected perpendicularly to the surface of sphere 46 and is axially aligned with first cylindrical shaft 50. Second cylindrical shaft 52 is rotatably received in a cylindrical recess in circular cone-shaped floor 42. A coil spring 54 is coiled around the outside of one end of second cylindrical shaft 52 and a pull cord 56 is connected to the other end of second cylindrical shaft 52 and coiled therearound. Pull cord 56 extends from second cylindrical shaft 52 through channel 58 in wall 40 to a handle 60 on the exterior of reduced diameter portion 36.

Coil spring 54 is connected at one end to second cylindrical shaft 52 and at the other end to cone-shaped floor 42. As handle 60 is pulled upward as shown in FIG. 3, pull cord 56 causes second cylindrical shaft 52 to rotate and rotate sphere 46 from the position shown in FIG. 2 to the position shown in FIG. 3, thereby enabling pet litter 22 to flow through passage 48 in sphere 46 into chamber 26 and onto floor 36. As cylindrical shaft 52 is rotated, coil spring 54 is rotated into a tighter coil, and when handle 60 is released, coil spring 54 rotates cylindrical shaft 52 and sphere 46 from the position shown in FIG. 3 to the position shown in FIGS. 2 and 4.

An alternate embodiment of the valve generally indicated by the numeral 44 is shown in FIG. 5 and is generally indicated by the numeral 44a. Valve 44a includes sphere 46 having a cylindrical passage 48 extending through the center thereof to the outer surfaces thereof. First cylindrical shaft 50 is rigidly connected perpendicularly to the surface of sphere 46 and aligned perpendicularly to the central axis of cylindrical passage 48. First cylindrical shaft 50 is rotatably received in cylindrical recess 50a in circular cone-shaped floor 42.

A second cylindrical shaft 52a is rigidly connected perpendicularly to the surface of sphere 46 and is axially aligned with first cylindrical shaft 50. Second cylindrical shaft 52a is rotatably received in a cylindrical recess in circular cone-shaped floor 42. Second cylindrical shaft 52a extends rotatably through exterior wall 36 and has lever 62 rigidly connected thereto for rotation thereof. A stop 63 is connected to the exterior wall 40 to limit the downward movement of lever 62. As lever 62 is pulled downward to the position shown in phantom lines in FIG. 5 against stop 63, shaft 52a rotates and rotates sphere 46 from the position shown in FIG. 2 to the position shown in FIG. 3, thereby enabling pet litter 22 to flow through passage 48 in sphere 46 into chamber 26 and onto floor 32. When lever 62 is returned to the position shown in solid lines in FIG. 5, cylindrical shaft 52a and sphere 46 rotates from the position shown in FIG. 3 to the position shown in FIG. 2.

Although the preferred embodiments of the invention have been described in detail above, it should be understood that the invention is in no sense limited thereby, and its scope is to be determined by that of the following claims.

What is claimed is:

1. A pet litter device having the outward shape of a chiminea, said pet litter device comprising:
    a. a hollow bulbous enlarged diameter portion having an upper end and a lower end, said lower end having a circular floor therein for receipt of pet litter, said hollow bulbous enlarged diameter portion having an opening therein for providing access to the interior of said hollow bulbous enlarged diameter portion,
    b. a hollow reduced diameter portion connected to the upper end of said hollow bulbous enlarged diameter portion for receipt and storage of pet litter, said hollow reduced diameter portion having a circular cone-shaped floor therein for supporting pet litter stored therein, the circular cone-shaped floor having a valve in the center thereof for selectively dispensing pet litter into the interior of said hollow bulbous enlarged diameter portion.

2. The pet litter device of claim 1 wherein said cone-shaped floor slopes downward.

3. The pet litter device of claim 1 wherein a cylindrical base portion is connected to said lower end of said hollow bulbous enlarged diameter portion.

4. The pet litter device of claim 3 wherein said cylindrical base portion has a hollow chamber therein.

5. The pet litter device of claim 4 wherein said hollow chamber has an opening therein for providing access thereto.

6. The pet litter device of claim 1 wherein said hollow reduced diameter portion has an opening therein for receipt of pet litter.

7. The pet litter device of claim 1 wherein the maximum diameter of said hollow reduced diameter portion is less than one-half of the maximum diameter of said hollow bulbous enlarged diameter portion.

8. The pet litter device of claim 1 wherein said valve includes a rotating sphere having a passage therein for selectively dispensing pet litter into the interior of said hollow bulbous enlarged diameter portion.

9. The pet litter device of claim 8 wherein said passage is cylindrical in shape.

10. The pet litter device of claim 8 wherein said sphere is rotatably connected to said circular cone-shaped floor by a shaft.

11. The pet litter device of claim 8 wherein said shaft has rotation means connected thereto for selectively rotating said shaft.

12. The pet litter device of claim 11 wherein said rotation means comprises a cord having a handle connected thereto.

13. The pet litter device of claim 11 wherein said rotation means comprises a lever arm.

* * * * *